United States Patent
Kao et al.

(10) Patent No.: US 9,891,724 B2
(45) Date of Patent: Feb. 13, 2018

(54) CIRCUIT AND STYLUS FOR CAPACITIVE TOUCHSCREEN

(71) Applicant: Adonit Co., Ltd., Taipei (TW)

(72) Inventors: Ting-Kuo Kao, Yilan (TW); Hsin Hsueh Wu, Taipei (TW); Chien-Pang Lin, Taipei (TW)

(73) Assignee: Adonit Co., Ltd., Taipei (TW)

( * ) Notice: Subject to any disclaimer, the term of this patent is extended or adjusted under 35 U.S.C. 154(b) by 0 days.

(21) Appl. No.: 15/145,819

(22) Filed: May 4, 2016

(65) Prior Publication Data

US 2017/0322645 A1 Nov. 9, 2017

(51) Int. Cl.
G06F 3/033 (2013.01)
G06F 3/0354 (2013.01)
G06F 3/044 (2006.01)
G06F 3/038 (2013.01)

(52) U.S. Cl.
CPC ........ *G06F 3/03545* (2013.01); *G06F 3/0383* (2013.01); *G06F 3/044* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 2012/0154340 A1* | 6/2012 | Vuppu | ..................... | G06F 3/044 345/179 |
| 2013/0002606 A1* | 1/2013 | Mann | ..................... | G06F 3/0383 345/174 |
| 2014/0176495 A1* | 6/2014 | Vlasov | ..................... | G06F 3/044 345/174 |
| 2015/0070293 A1* | 3/2015 | Yu | ........................... | G06F 3/044 345/174 |

FOREIGN PATENT DOCUMENTS

WO   WO 2014127383 A2 *   8/2014   ............. G06F 3/044

\* cited by examiner

*Primary Examiner* — Lixi C Simpson
(74) *Attorney, Agent, or Firm* — Muncy, Geissler, Olds & Lowe, P.C.

(57) ABSTRACT

Embodiments of a circuit and a stylus for interacting with a capacitive sensor are disclosed. The stylus includes a stylus body, a circuit disposed within the stylus body, a tip, and a power source. The circuit includes an input terminal, an amplifier, and an output terminal. The tip includes a sensing electrode and an emitting electrode, and the tip is disposed on a proximal end of the stylus body. The power source is electrically coupled to the circuit. The input terminal of the circuit is electrically coupled to the sensing electrode of the tip, and the output terminal of the circuit is electrically coupled to the emitting electrode of the tip. The circuit receives a signal through the sensing electrode, amplifies and inverts the signal, and outputs the signal through the emitting electrode. The amplifier of the circuit amplifies only a portion of the signal that exceeds a threshold voltage.

16 Claims, 8 Drawing Sheets

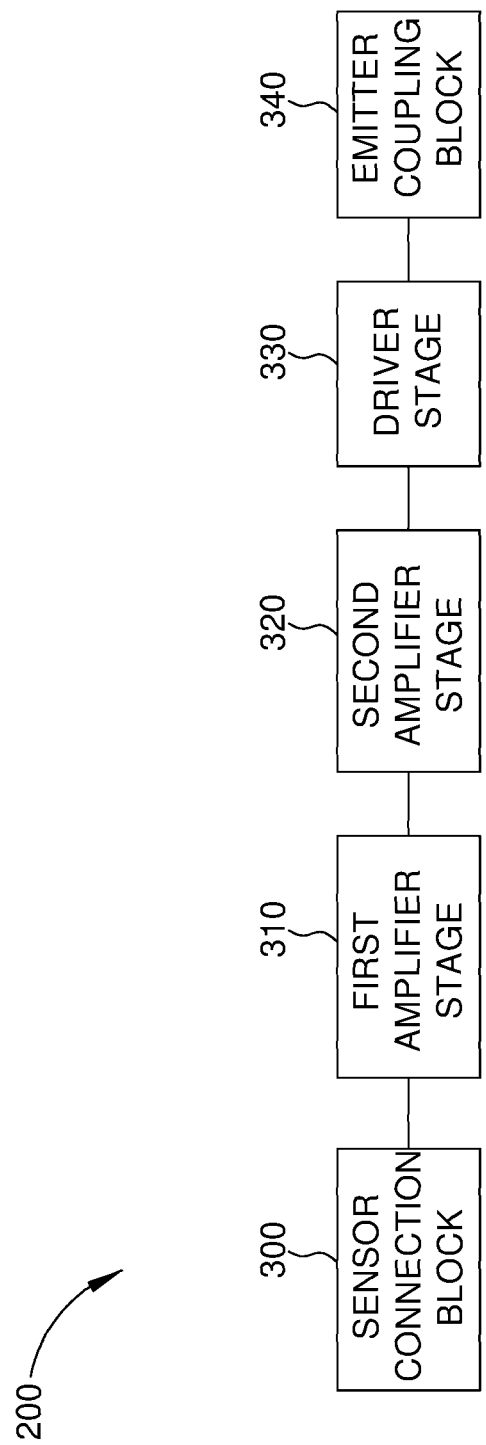

CIRCUIT AND STYLUS FOR CAPACITIVE TOUCHSCREEN

CROSS REFERENCE TO RELATED APPLICATIONS

This application claims the benefit of priority to U.S. provisional patent application No. 62/158,535, filed May 8, 2015, and entitled "CIRCUIT AND STYLUS FOR CAPACITIVE TOUCHSCREEN", the disclosure of which is hereby incorporated by reference in its entirety.

FIELD OF THE DISCLOSURE

The disclosure relates to a stylus for use with a capacitive touchscreen, and more specifically to a stylus using active electronics to interact with a capacitive touchscreen.

SUMMARY OF THE PRIOR ART

Generally speaking, styluses for use with capacitive touchscreens require a minimum level of capacitance between the stylus and the touchscreen for the capacitive sensor in the touchscreen to accurately detect the position of the stylus. Nowadays, most such styluses are passive, having a wide conductive tip that is electrically coupled to the stylus body, such that when the body is gripped by a user, the user is electrically coupled to the tip. This allows the capacitance of the user's body to be sensed by the touchscreen across a large enough area to simulate a fingertip touch. Touchscreens on many of the most popular devices today require such large touches and capacitances in order to function; contacts by smaller capacitances or across smaller contact regions are ignored by the devices' firmware in order to reject capacitive noise, thereby helping to lower complexity and cost.

Precisely locating and "touching" points on a screen is aided by having a stylus with a small, non-deforming tip. Not only does a small tip allow the surrounding screen to be seen by the user, thereby helping the user to position the tip precisely, but also a non-deforming tip means that the firmware will have a consistent contact shape from which to determine the centroid.

Higher resolution touchscreens exist, but generally require a stylus that is specifically designed to interact with the given touchscreen so that the touchscreen can ignore other touches as noise. This eliminates the user's ability to use a fingertip to interact with the touchscreen, drastically reducing convenience and requiring that special hardware (the stylus) be developed and kept with the device.

Touchpad capacitive sensors are designed to require close proximity to avoid accidental touch detection, further limiting their capabilities. For example, custom hardware has been developed by some manufacturers that enable a stylus to be detected at some distance from the screen, thus allowing a touchscreen to display a cursor at an anticipated contact point. But this does not work for standard capacitive touchscreens which are designed to detect the capacitance of a user's fingertip; instead, special hardware for these touchscreens requires the use of a special stylus, thereby entirely preventing users from using their fingertips.

A stylus capable of interacting with a mutual capacitance touch device using a small, non-deformable tip is therefore desirable.

SUMMARY OF CERTAIN EMBODIMENTS

In one aspect, embodiments of the invention provide a circuit for interacting with a capacitive sensor. The circuit includes an input terminal, an amplifier, and an output terminal. The amplifier receives a signal from the input terminal, inverts and amplifies the signal, and emits the signal through the output terminal. Moreover, the amplifier amplifies a portion of the signal that exceeds a threshold voltage.

According to an embodiment of the invention, the amplifier includes a plurality of amplifier stages.

According to an embodiment of the invention, the amplifier further includes a driver stage, in which the driver stage includes a first capacitor, a first driver subcircuit, a first resistor pair, a second capacitor, a second driver subcircuit, and a second resistor pair. The first driver subcircuit includes a first PNP transistor having an emitter coupled to a first power supply voltage. The first resistor pair has a first terminal electrically coupled to the first power supply voltage, a second terminal electrically coupled to a base of the first PNP transistor and a first terminal of the first capacitor, and a third terminal electrically coupled to a ground. The second driver subcircuit includes a first NPN transistor, in which the second driver subcircuit is connected between the first driver subcircuit and the ground. The second resistor pair has a first terminal electrically coupled to the first power supply voltage, a second terminal electrically coupled to a base of the first NPN transistor and a first terminal of the second capacitor, and a third terminal electrically coupled to the ground.

According to an embodiment of the invention, the first PNP transistor of the first driver subcircuit matches the first NPN transistor of the second driver subcircuit.

According to an embodiment of the invention, the ground in the driver stage is changed to a second power supply voltage that is opposite in polarity to the first power supply voltage.

According to an embodiment of the invention, the driver stage is electrically coupled to the output terminal through a third capacitor.

According to an embodiment of the invention, the first amplifier stage includes a fourth capacitor, a second NPN transistor, a third resistor pair, and a fifth capacitor. The fourth capacitor has a first terminal coupled to the input terminal. The second NPN transistor has a collector electrically coupled to a third power supply voltage and a first terminal of the third resistor pair, a base electrically coupled to a second terminal of the fourth capacitor and a second terminal of a third resistor pair, and an emitter electrically coupled to the ground. The third resistor pair has a first terminal electrically coupled to the third power supply voltage, the second terminal electrically coupled to the base of the NPN transistor and the second terminal of the fourth capacitor, and a third terminal electrically coupled to the ground. The fifth capacitor has a first terminal electrically coupled to the third power supply voltage, the third resistor pair, and the second NPN transistor, and a second terminal electrically coupled to the ground.

According to an embodiment of the invention, the second amplifier stage includes a fifth capacitor, a third NPN transistor, a fourth resistor pair, and a sixth capacitor. The fifth capacitor has first terminal coupled to the first amplifier stage. The third NPN transistor has a collector electrically coupled to the third power supply voltage, the second terminal of the first capacitor, and the second terminal of the second capacitor, a base electrically coupled to a second terminal of the fifth capacitor and a second terminal of a fourth resistor pair, and an emitter electrically coupled to the ground. The fourth resistor pair has a first terminal electrically coupled to the third power supply, the second terminal electrically coupled to the base of the NPN transistor and a second terminal of the fourth capacitor, and a third terminal electrically coupled to the ground. The sixth capacitor has a first terminal electrically coupled to the third power supply voltage, the first terminal of the fourth resistor pair, and the collector of the third NPN transistor, and a second terminal electrically coupled to the ground.

According to an embodiment of the invention, the first amplifier stage includes a fourth capacitor, a second NPN transistor, a third resistor pair, and a fifth capacitor. The fourth capacitor has a first terminal coupled to the input terminal. The second NPN transistor has a collector electrically coupled to a third power supply, a first terminal of a third resistor pair, the second terminal of the first capacitor, and the second terminal of the second capacitor, a base electrically coupled to a second terminal of the fourth capacitor and a second terminal of the third resistor pair, and an emitter electrically coupled to the ground. The third resistor pair has the first terminal electrically coupled to the third power supply voltage, the second terminal electrically coupled to the base of the NPN transistor and the second terminal of the fourth capacitor, and a third terminal electrically coupled to the ground. The fifth capacitor has a first terminal electrically coupled to the third power supply voltage, the third resistor pair, and the collector of the second NPN transistor, and a second terminal electrically coupled to the ground.

According to an embodiment of the invention, the input terminal is electrically coupled to a ground through a varistor.

In another aspect of the invention, embodiments of the invention provide a stylus for a capacitive sensor, including a stylus body, a circuit disposed within the stylus body, a tip, and a power source. The circuit includes an input terminal, an amplifier, and an output terminal. The tip includes a sensing electrode and an emitting electrode, and the tip is disposed on a proximal end of the stylus body. The power source is electrically coupled to the circuit. The input terminal of the circuit is electrically coupled to the sensing electrode of the tip, and the output terminal of the circuit is electrically coupled to the emitting electrode of the tip. The circuit receives a signal through the sensing electrode, amplifies and inverts the signal, and outputs the signal through the emitting electrode. The amplifier of the circuit amplifies only a portion of the signal that exceeds a threshold voltage.

BRIEF DESCRIPTION OF THE DRAWINGS

FIG. 2, which is a block diagram of an amplifier circuit 200A according to an embodiment of the invention.

DESCRIPTION OF THE EMBODIMENTS

Figure 1:
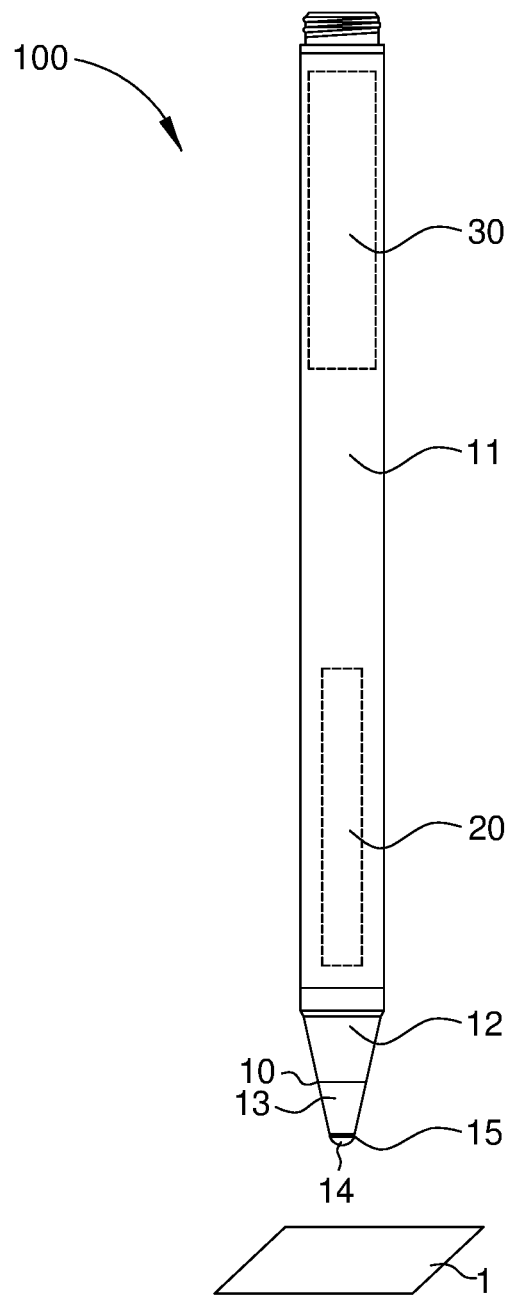
FIG. 1 is a perspective view of a stylus and a touchscreen according to an embodiment of the invention.

The following detailed description of embodiments references the accompanying drawings that form a part hereof, in which are shown various illustrative embodiments through which the invention may be practiced. In the drawings, like reference numbers indicate like features or functionally identical steps. The embodiments are described in sufficient detail to enable those skilled in the art to practice the invention, and it is to be understood that other embodiments may be utilized and that logical changes may be made without departing from the spirit and scope of the invention. The detailed description is therefore not to be taken in a limiting sense, and the scope of the invention is defined solely by the appended claims.

Please refer to FIG. 1, which is a perspective view of a stylus 100 and a touchscreen 1 according to an embodiment of the invention. In the present embodiment, the stylus 100 includes a tip 10, a body 11, a fairing 12, an emitting electrode 13, a sensing electrode 14, and a shield 15. A printed circuit board 20 and a battery 30 depicted as dashed outlines may be housed inside the body 11. The body 11 may be attached into the fairing 12. In the present embodiment, the printed circuit board 20 may include all circuitry necessary to implement the various electronic functions of the stylus 100, including a battery charging circuit, an amplifier circuit, and a power supply circuit for the amplifier circuit, a communication module for communicating with the touchscreen 1, a power switch, and so forth, although the invention is not limited thereto. For example, the amplifier circuit may modify amplification of the signal according to information received from the device through the communication module in the printed circuit board 20. In a passive capacitive stylus, the stylus body may serve to electrically couple a conductive tip to the user's hand. On the other hand, an active stylus does not necessarily need to use the stylus body to couple the conductive tip to the hand, and therefore the active stylus may be made of either conductive or nonconductive materials, or a combination thereof. In the present embodiment, the body 11 of the stylus 100 may serve to hold the tip 10 and to contain active electronic circuitry 20 and the battery 30 for powering the active electronic circuitry 20. In FIG. 1, the tip 10 may be an anodized sensor/emitter tip, for example, although the invention is not limited thereto. The shield may separate the emitting electrode 13 and the sensing electrode 14. The touchscreen 1 may be any type of touchscreen containing a sensor capable of sensing a mutual capacitance between the stylus 100 and the touchscreen 1.

Please refer to FIG. 2, which is a block diagram of an amplifier circuit 200A according to an embodiment of the invention. In the present embodiment, the amplifier circuit 200A may include a sensor connection block 300, a first amplifier stage 310, a second amplifier stage 320, a driver stage 330, and an emitter coupling block 340. The sensor connection block 300 and the emitter coupling block 340 may respectively serve as an input terminal and an output terminal of the amplifier circuit 200A, whereas the first amplifier stage 310 and the second amplifier stage 320 may serve as an amplifying portion of the amplifier circuit 200A. The amplifier circuit 200A may have a signal output range of approximately 18V to 40V, although other signal output ranges are possible according to designer needs. Below 18V, common capacitive touchscreens such as those on the Apple® iPad® may not be sufficiently affected to cause them to detect a touch, while above 40V the signal may cross-couple between the sensing electrode and the emitting electrode of the stylus, which causes feedback, as well as excessive and unnecessary power use.

Figure 3A:
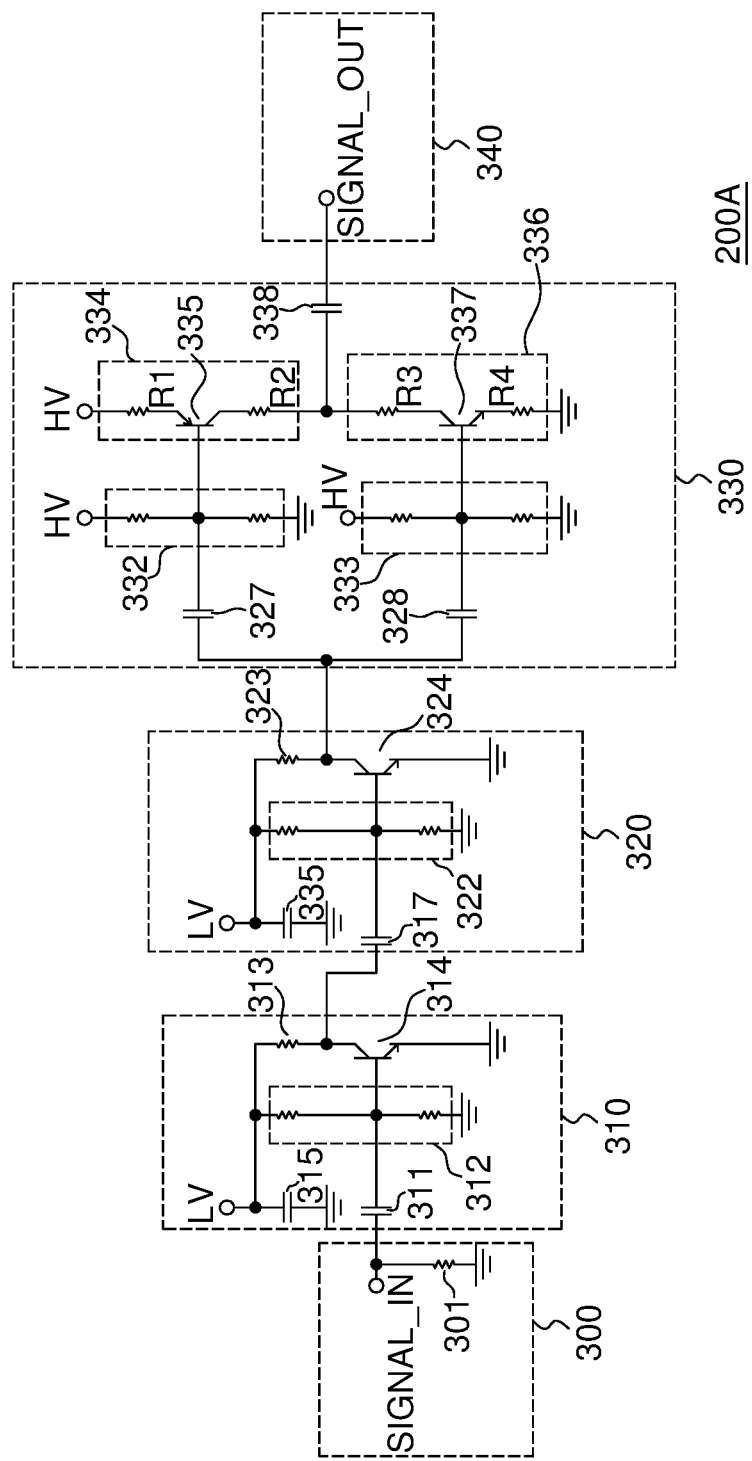
FIG. 3A is a circuit diagram of an amplifier circuit according to an embodiment of the invention.

FIG. 3A is a circuit diagram of the amplifier circuit 200A according to an embodiment of the invention. Referring to FIG. 3A, the sensor connection block 300 serving as the input terminal of the amplifier circuit 200A may be connected to a ground through a resistor 301. In some embodiments, the resistor 301 may be a varistor, for example. The varistor 301 may act as a protection mechanism for the amplifier circuit 200A in the event that the sensing electrode 14 is connected to electrical current, such as when a misbehaving child sticks the stylus tip into a wall outlet, for example. According to the present embodiment, in the first amplifier stage 310 of the amplifier circuit 200A, a sensing electrode connected to the sensor connection block 300, such as the sensing electrode 14 of the stylus 100 shown in FIG. 1, is electrically coupled to a first terminal of a capacitor 311 of the first amplifier stage 310 to achieve low frequency cancellation, for example. The capacitor 311 may be used to eliminate low frequency noise such as electrical hum that might otherwise be overlaid upon the desired signal. Power to the first amplifier stage 310 may be supplied through a level shifting resistor pair 312 and a power resistor 313. A capacitor 315 has a first terminal coupled to a power supply voltage LV (e.g. +3V) and a second terminal coupled to a ground. The capacitor 315 may be used as a power noise filtering capacitor to eliminate noise generated by a power supply circuit (not shown). The level shift resistor pair 312 may serve to pull an input signal SIGNAL_IN from a typical input level of 0V±20 mV to a level of 0.5V±20 mV. The level-shifted signal is fed into an amplifying transistor 314, which inverts and amplifies the signal. The transistor 314 may be a NPN transistor, and the transistor 314 may have a collector electrically coupled to the power supply voltage LV and a first terminal of the resistor pair 312, a base electrically coupled to a second terminal of the capacitor 311 and a second terminal of the resistor pair 312, and an emitter electrically coupled to the ground. A third terminal of the resistor pair 312 is also connected to the ground.

As shown in FIG. 3A, the inverted and amplified signal from the first amplifier stage 310 is outputted and fed into the second amplifier stage 320 through a capacitor 317 serving to again filter out low frequency noise. The capacitor 317 has a first terminal coupled to the collector of the transistor 314. In the present embodiment, power to the second amplifier stage 320 may be supplied through a level shifting resistor pair 322 and a power resistor 323. A capacitor 335 has a first terminal coupled to the power supply voltage LV (e.g. +3V) and a second terminal coupled to the ground. The capacitor 335 may be used to filter out noise from the power supply circuit (not drawn). The level shifting resistor pair 322 may further serve pull the output signal from the first amplifier stage 310 to a level suitable for the driver stage 330. The level-shifted signal is fed into an amplifying transistor 324, which again inverts and amplifies the signal. The transistor 324 may be a NPN transistor, and the transistor 324 may have a collector electrically coupled to the power supply voltage LV, a base electrically coupled to a second terminal of the capacitor 317 and a second terminal of the resistor pair 322, and an emitter electrically coupled to the ground. A third terminal of the resistor pair 322 is also connected to the ground. Output from the second amplifier stage 320 is filtered by the capacitors 327 and 328 in the driver stage 330 to remove low frequency noise, and is fed into the driver stage 330. In the present embodiment, the amplifying transistor 324 is electrically coupled to the capacitors 327 and 328 via the collector of the amplifying transistor 324, and the second amplifier stage 320 may amplify the signal to approximately 0-3V peak-to-peak.

In the amplifier circuit 200A depicted in FIG. 3 according to the present embodiment, the driver stage 330 uses a level setting resistor pair 332 and a level setting resistor pair 333 to eliminate signals below a threshold voltage level Vthreshold. By selecting an appropriate level below which the inverted and amplified signal is eliminated, the output signal is transmitted only when a signal from a nearby trace is detected, and so capacitive charging is suppressed only when appropriate. Failure to so limit the output signal may result in a "wavy line problem", in which suppression is performed for other columns in addition to the nearest, causing the capacitive sensor to sense a touch across a wide area, which may in turns results in the touch circuit hardware and firmware sending incorrect position data in touch events. The end result is that if a user attempts, for example, to draw a line across a screen, the line is not straight, but rather follows a wavy or sinusoidal path. Although one or both of the level setting resistor pair 332 and the level setting resistor pair 333 may be optional, the resistor pairs 332 and 333 may provide significant benefit to the circuit and to the end user by eliminating the wavy line problem through an extremely simple hardware solution rather than a complex software method or mixed hardware-software means. After filtering and level-setting, the signal is fed into the first driver subcircuit 334 and the second driver subcircuit 336, which amplify and invert the signal for a third time. In the present embodiment, the first driver subcircuit 334 is electrically connected in series with the second driver subcircuit 336. The first driver subcircuit 334 may include a PNP transistor 335 electrically coupled between two resistors R1 and R2, and the second driver subcircuit 336 may include a NPN transistor 337 electrically coupled between two resistors R3 and R4, and the first driver subcircuit 334 and the second driver subcircuit 336 may be implemented in a symmetrical push-pull configuration to reduce distortion, in which the PNP transistor 335 matches the NPN transistor 337.

Figure 3B:
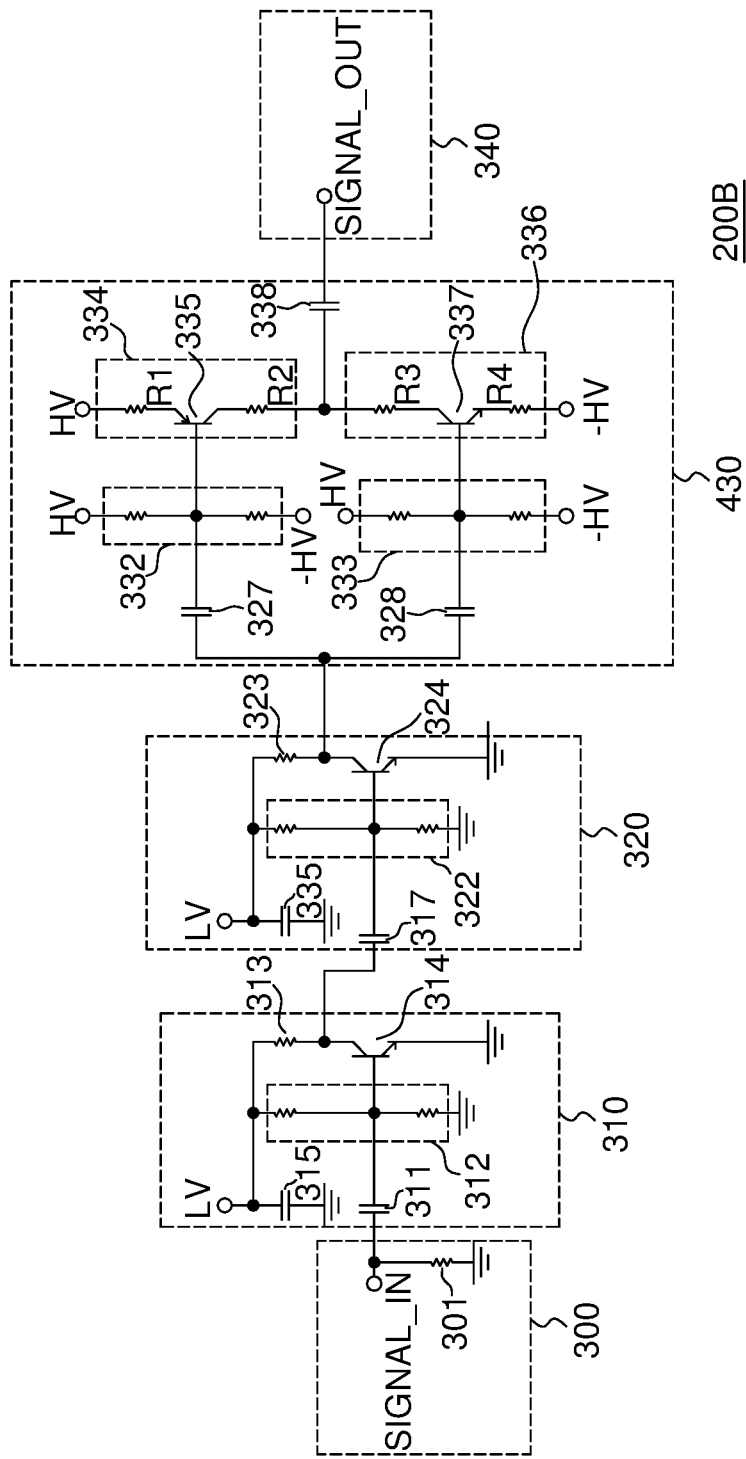
FIG. 3B is a circuit diagram of an amplifier circuit according to another embodiment of the invention.

In some embodiments of the invention, the PNP transistor 335 has an emitter electrically coupled to a power supply voltage HV (e.g. +30V) through the power resistor R1, and the second driver subcircuit 336 is connected between the first driver subcircuit 334 and the ground. The resistor pair 332 has a first terminal electrically coupled to the power supply voltage HV, a second terminal electrically coupled to a base of the PNP transistor 335 and a first terminal of the capacitor 327, and a third terminal electrically coupled to the ground. Moreover, the resistor pair 333 has a first terminal electrically coupled to the power supply voltage HV, a second terminal electrically coupled to a base of the NPN transistor 337 and a first terminal of the capacitor 328, and a third terminal electrically coupled to the ground. Furthermore, the second terminals of the capacitors 327 and 328 are electrically coupled to the collector of the NPN transistor 324 in the second amplifier stage 320. The power supply voltage HV may be supplied by a charge pump circuit (not shown), for example, although the invention is not limited thereto, and other methods of providing the power supply voltage HV known in the art may be used. It should also be appreciated that, even though the driver stage 330 depicted in FIG. 3A may have the PNP transistor 335 in the first driver subcircuit 334 matching the NPN transistor 337 in the second driver subcircuit 336, the invention is not limited by the configuration of FIG. 3A. Other push-pull amplifier configurations may be implemented in the driver stage 330 to fulfill the needs from the designer. For example, FIG. 3B is a circuit diagram of an amplifier circuit 200B according to another embodiment of the invention. With reference to FIG. 3B, a difference in the amplifier circuit 200B of FIG. 3B and the amplifier circuit 200A of FIG. 3A is that, in some embodiments, the ground in the driver stage 330 of FIG. 3A has been changed to a power supply voltage −HV in a driver stage 430 of FIG. 3B, in which the power supply voltage −HV is opposite in polarity to the power supply voltage HV. For instance, when the power supply voltage HV is 30V, than the power supply voltage −HV would be −30V for the driver stage 430 in the amplifier circuit 200B of FIG. 3B. In the configuration depicted in FIG. 3B, an enhanced output range may be achieved, although other modifications may be possible to satisfy other requirements.

In some embodiments of the invention, an output signal SIGNAL_OUT from the driver stage 330 may be outputted to an emitting electrode through a capacitor 338 to level-shift the signal and/or eliminate low-level noise. The emitting electrode may be, for example, the emitting electrode 13 of the tip 10 in the stylus 100. It should be further noted that, although not shown in the circuit diagrams of FIG. 3A and FIG. 3B, the shield 15 of the stylus 100 may be coupled to the ground.

Figure 4:
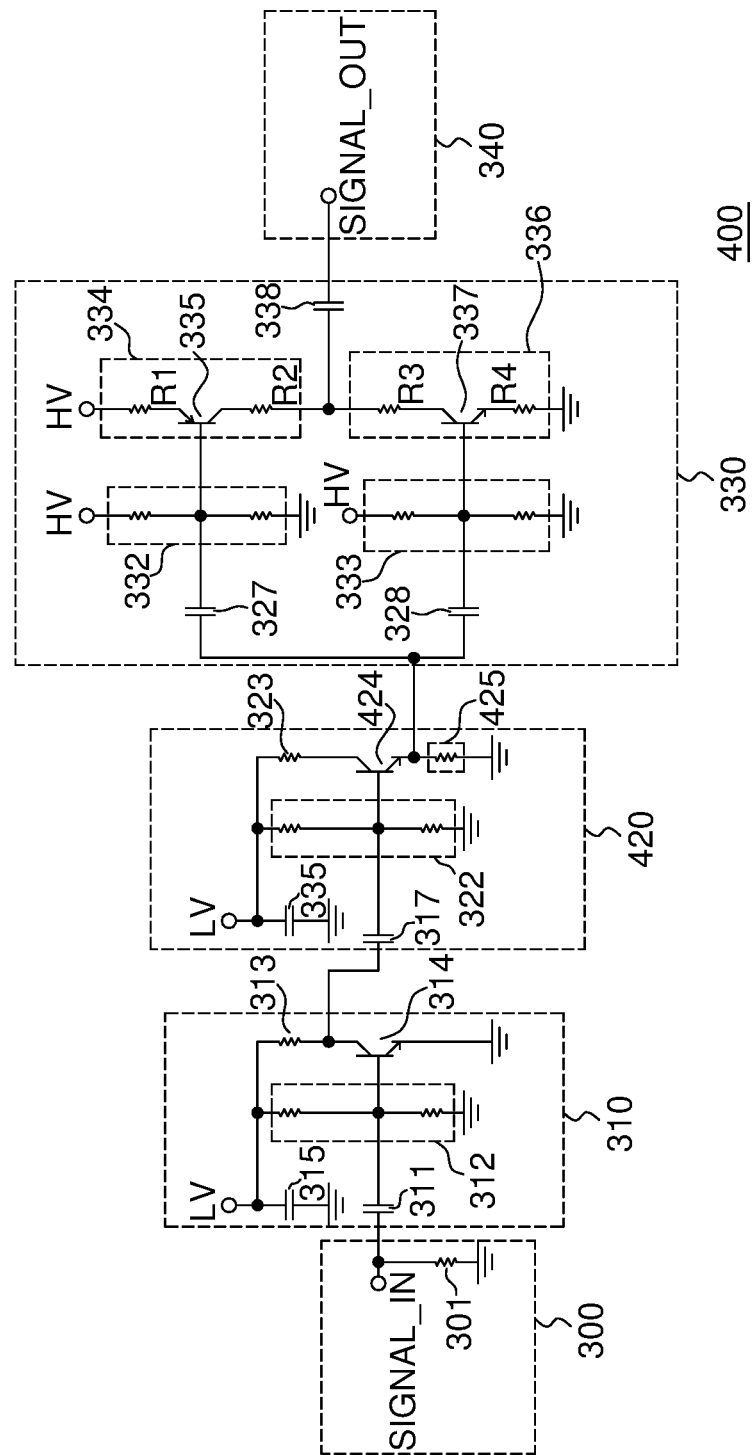
FIG. 4 is a circuit diagram of an amplifier circuit according to an embodiment of the invention.

It should be appreciated that the second amplifier stage 320 is not limited to the configuration shown in FIG. 3. FIG. 4 is a circuit diagram of an amplifier circuit 400 according to an embodiment of the invention. A difference between the amplifier circuit 400 of FIG. 4 and the amplifier circuit 200A of FIG. 3 is that, in some embodiments, a second amplifier stage 420 may further include an emitter subcircuit 425, and a NPN transistor 424 may be electrically coupled to the capacitor 327 and the capacitor 328 via the emitter of the NPN transistor 424. That is, in the amplifier circuit 400 of FIG. 4, the NPN transistor 424 has a collector electrically coupled to the power supply voltage LV, a base electrically coupled to the second terminal of the capacitor 317 and a second terminal of the resistor pair 322, and an emitter electrically coupled to the ground, the second terminal of the capacitor 327, and the second terminal of the capacitor 328. In the present embodiment, the emitter subcircuit 425 may include a resistor coupled between the emitter of the NPN transistor 424 and the ground. Compared to second amplifier stage 320 in the amplifier circuit 200A depicted in FIG. 3, the second amplifier stage 420 in the amplifier circuit 400 may achieve comparatively high current gain and low voltage gain and output a non-inverting signal, which may be useful for devices which require non-inverting signal from the emitting electrode 13 of the stylus 100.

Figure 5:
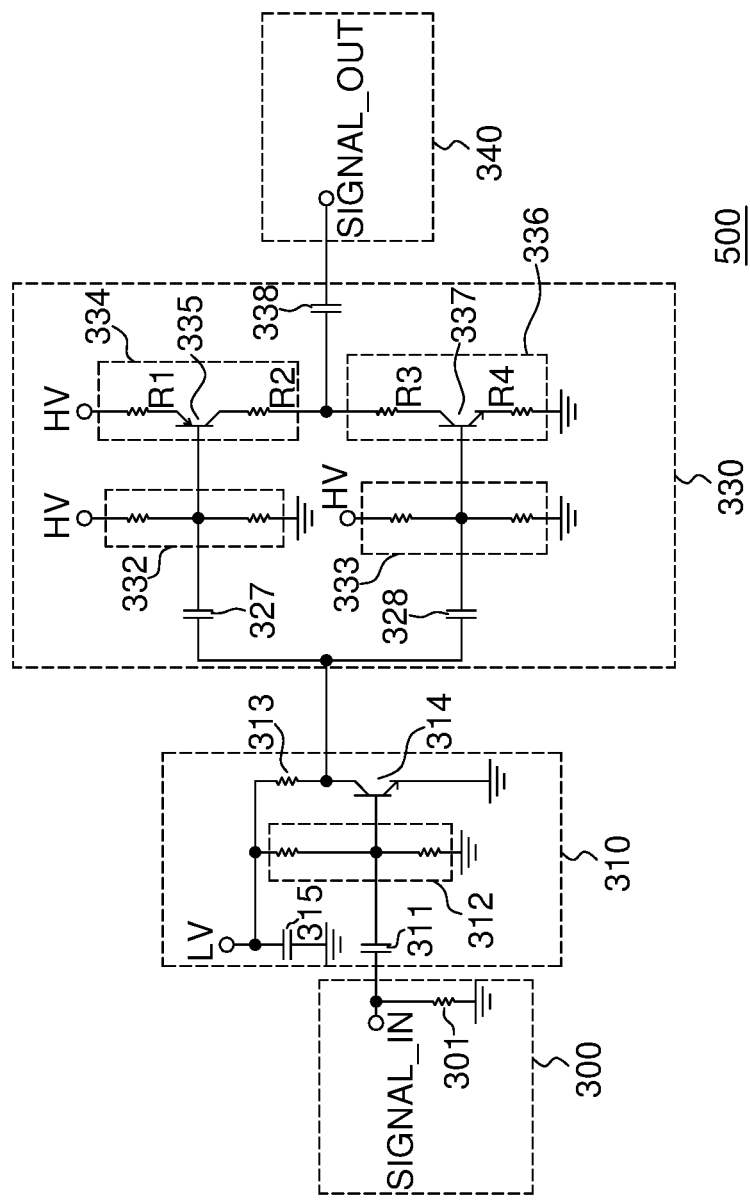
FIG. 5 is a circuit diagram of an amplifier circuit according to an embodiment of the invention.

It should be noted that other configurations of the amplifier circuit 400 may be implemented to achieve a non-inverting output signal. FIG. 5 is a circuit diagram of an amplifier circuit 500 according to an embodiment of the invention. A difference between the amplifier circuit 500 of FIG. 5 and the amplifier circuit 200A of FIG. 3A is that, in some embodiments, the second amplifier stage 320 may be omitted when a non-inverting output signal is needed, and the first amplifier stage 310 is directly coupled to the driver stage 330. In these embodiments, the NPN transistor 314 in the first amplifier stage 310 has a collector electrically coupled to the power supply voltage LV, the first terminal of the resistor pair 312, the second terminal of the capacitor 327, and the second terminal of the second capacitor 328, a base electrically coupled to the second terminal of the capacitor 311 and the second terminal of the resistor pair 312, and an emitter electrically coupled to the ground. By omitting the second amplifier stage 320, the compact configuration of the amplifier circuit 500 may achieve a non-inverting output signal even when space is limited.

Figure 6:
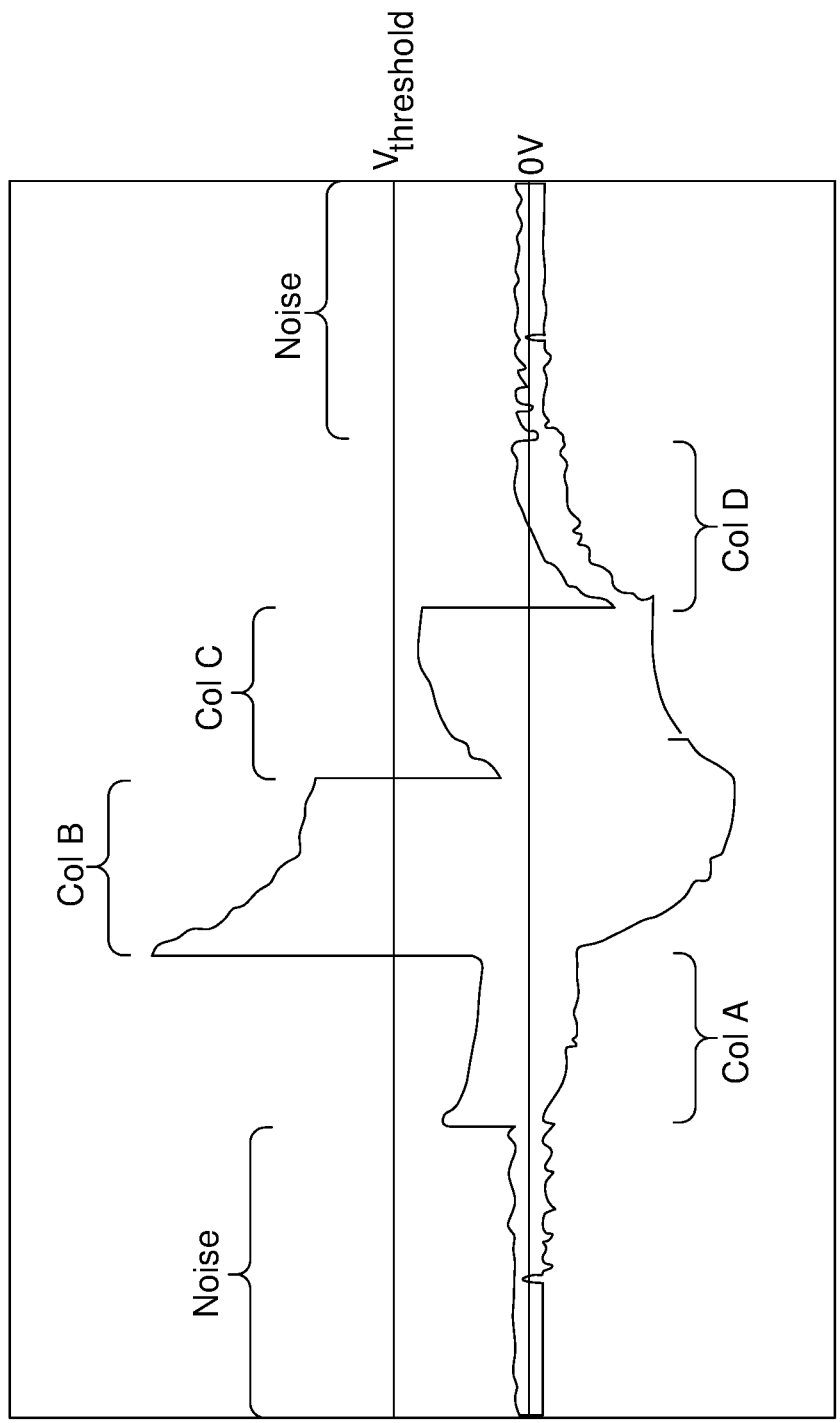
FIG. 6 is a waveform diagram showing an example of a sequential scan of the column traces of a typical mutual-capacitance touchscreen and the capacitance generated between the touchscreen and an oscilloscope probe.

Please refer to FIG. 6, which is a waveform diagram showing an example of a sequential scan of the column traces of a typical mutual-capacitance touchscreen and the capacitance generated between the touchscreen and an oscilloscope probe. The touchscreen may be the touchscreen 1 depicted in FIG. 1, in which the touchscreen 1 contains a capacitive sensor. The oscilloscope probe detects the column trace from four separate columns of the touchscreen. The detected voltages indicate that the probe is located between the second and third column, and is closer to the second column trace than to the third. To the far left, the oscilloscope probe detects only noise. In the segment labeled "Col A", a first ITO trace for a first column is energized, and capacitance between the probe and the touchscreen builds, eventually reaching an equilibrium. In the segment labeled "Col B", the second ITO trace for the second column is energized, and because the probe is closer to this trace, the detected voltage is significantly higher and the resulting mutual capacitance moves to equalize at a higher level, about four times the level of "Col A". Note that for "Col B", but not for the other columns or the noise, the voltage detected exceeds the input equivalent of the Vthreshold voltage described below. In the segment labeled "Col C", the third ITO trace corresponding to the third column is energized. The amount of energy received is only about twice as much as was received for "Col A", and so the curvature of the slope is negative, as the capacitance gradually stabilizes at a lower level. In the segment labeled "Col D", a fourth ITO trace corresponding to the fourth nearby column is energized. Only a small amount of voltage is detected by the probe, and the curvature is again negative. Subsequently, the detected voltage again reduces to the level of the noise from the system. The relative amounts of energy detected by the probe indicate that the oscilloscope's probe was located between Column B and Column C, and was closer to Column B.

Figure 7:
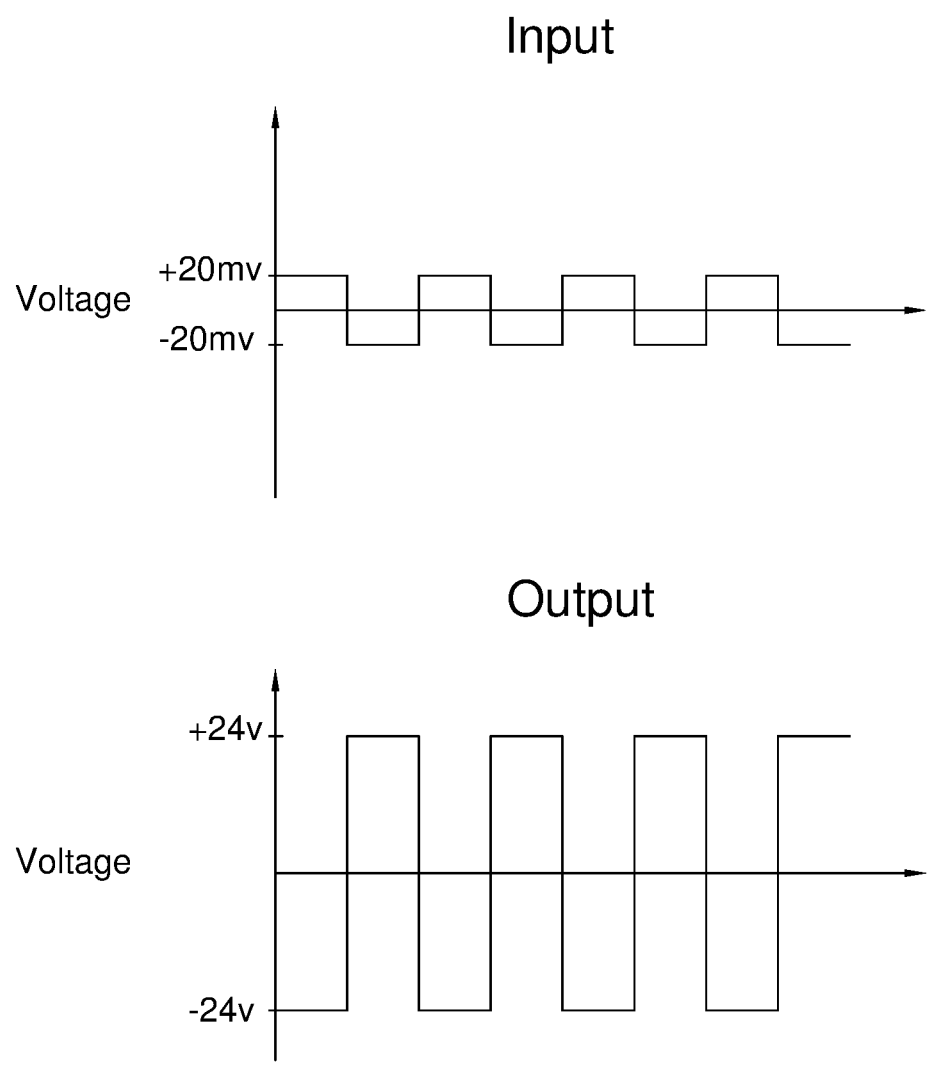
FIG. 7 includes waveform diagrams showing both an idealized signal from a touchscreen and an idealized resultant output signal from a stylus according to an embodiment of the invention.

Please refer now to FIG. 7, which includes waveform diagrams showing both an idealized signal from a touchscreen and an idealized resultant output signal from the stylus 100 according to an embodiment of the invention. The idealized representation of the input waveform is representative of a short sample of one segment of the oscilloscope trace shown in FIG. 6. This expanded view of the input waveform shows a square wave of about 40 mV peak-to-peak (+−20 mV). The stylus 100 detects this signal and may respond by emitting an inverted amplified signal, the output waveform, also a square wave, of about 40V peak-to-peak (+−20V). The inverting amplifier circuit 200A, for example, takes the input voltage signal and outputs a function of that voltage signal, where the output voltage follows the following function (in C language syntax):

$$V\text{out}=(V\text{in}<V\text{threshold}?0:-K*V\text{in})$$

where K is a large constant. When the detected voltage is below a threshold value, no voltage is output; when the detected voltage is at or above a threshold value, the voltage is inverted and amplified to the saturation limit of the circuit, resulting in a series of square-wave pulses. Alternately, this output voltage may be level-shifted so that both positive and negative voltage square wave components are output; the function followed is along the lines of:

$$V\text{out}=(V\text{in}<V\text{threshold}?K*V\text{in}:-K*V\text{in})$$

Because the input is a square wave, the output will likewise be a square wave, but inverted compared to the input signal, and at a significantly higher amplitude. Embodiments of the amplifier circuit 200A, 400, and 500 may amplify the signal by a factor (K) of about 600 to 1500, resulting in an input signal having a threshold voltage of 20 mV being amplified to between 12V to 40V depending on the requirements of a particular implementation. Please note that the actual threshold-setting circuit may be implemented at any stage of the amplifier, but in the embodiments as shown it has been put in the final stage driver circuit. The input signal thus may be amplified and shifted repeatedly before an intermediate signal is compared against Vthreshold; the input equivalent of Vthreshold may thus be significantly different from the Vthreshold that the intermediate signal is compared to within the circuit. It should also be appreciated that, although the input signal has been described as a rectangular wave signal, there is no limitation on the waveform shape of the input signal, such that the input signal may be of any waveform, such as a sine wave signal, for example.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A circuit for interacting with a capacitive sensor, the circuit comprising:
   an input terminal, an amplifier, and an output terminal,
   the amplifier receiving a signal from the input terminal, inverting and amplifying the signal, and emitting the signal through the output terminal,
   wherein the amplifier amplifies only a portion of the signal that exceeds a threshold voltage;
   wherein the amplifier comprises a plurality of amplifier stages;
   wherein the amplifier further comprises a driver stage, and the driver stage comprises:
      a first capacitor;
      a first driver subcircuit comprising a first PNP transistor, the first PNP transistor having an emitter coupled to a first power supply voltage;
      a first resistor pair having a first terminal electrically coupled to the first power supply voltage, a second terminal electrically coupled to a base of the first PNP transistor and a first terminal of the first capacitor, and a third terminal electrically coupled to a ground;
      a second capacitor;
      a second driver subcircuit comprising a first NPN transistor, the second driver subcircuit being connected between the first driver subcircuit and the ground; and
      a second resistor pair having a first terminal electrically coupled to the first power supply voltage, a second terminal electrically coupled to a base of the first NPN transistor and a first terminal of the second capacitor, and a third terminal electrically coupled to ground.

2. The circuit of claim 1, wherein the first PNP transistor of the first driver subcircuit matches the first NPN transistor of the second driver subcircuit.

3. The circuit of claim 2, wherein the ground in the driver stage is changed to a second power supply voltage that is opposite in polarity to the first power supply voltage.

4. The circuit of claim 1, wherein the driver stage is electrically coupled to the output terminal through a third capacitor.

5. The circuit of claim 4, wherein a first amplifier stage comprises:
   a fourth capacitor having a first terminal coupled to the input terminal;
   a second NPN transistor having a collector electrically coupled to a third power supply voltage and a first terminal of a third resistor pair, a base electrically coupled to a second terminal of the fourth capacitor and a second terminal of a third resistor pair, and an emitter electrically coupled to the ground;
   the third resistor pair having a first terminal electrically coupled to the third power supply voltage, the second terminal electrically coupled to the base of the NPN transistor and the second terminal of the fourth capacitor, and a third terminal electrically coupled to the ground; and
   a fifth capacitor having a first terminal electrically coupled to the third power supply voltage, the third resistor pair, and the second NPN transistor, and a second terminal electrically coupled to the ground.

6. The circuit of claim 5, wherein a second amplifier stage comprises:
   a sixth capacitor having a first terminal coupled to the first amplifier stage;
   a third NPN transistor having a collector electrically coupled to the third power supply voltage, the second terminal of the first capacitor, and the second terminal of the second capacitor, a base electrically coupled to a second terminal of the fifth sixth capacitor and a second terminal of a fourth resistor pair, and an emitter electrically coupled to the ground;
   the fourth resistor pair having a first terminal electrically coupled to the third power supply, the second terminal electrically coupled to the base of the NPN transistor and a second terminal of the fourth capacitor, and a third terminal electrically coupled to the ground; and
   a seventh capacitor having a first terminal electrically coupled to the third power supply voltage, the first terminal of the fourth resistor pair, and the collector of the third NPN transistor, and a second terminal electrically coupled to the ground.

7. The circuit of claim 5, wherein a second amplifier stage comprises:
   a sixth capacitor having a first terminal coupled to the first amplifier stage;
   a third NPN transistor having a collector electrically coupled to the third power supply voltage, a base electrically coupled to a second terminal of the sixth capacitor and a second terminal of a fourth resistor pair, and an emitter electrically coupled to the ground, the second terminal of the first capacitor, and the second terminal of the second capacitor;
   the fourth resistor pair having a first terminal electrically coupled to the third power supply, the second terminal electrically coupled to the base of the NPN transistor and a second terminal of the fourth capacitor, and a third terminal electrically coupled to the ground; and
   a seventh capacitor having a first terminal electrically coupled to the third power supply voltage, the first terminal of the fourth resistor pair, and the collector of the third NPN transistor, and a second terminal electrically coupled to the ground.

8. The circuit of claim 4, wherein a first amplifier stage comprises:
a fourth capacitor having a first terminal coupled to the input terminal;
a second NPN transistor having a collector electrically coupled to a third power supply, a
first terminal of a third resistor pair, the second terminal of the first capacitor, and the second terminal of the second capacitor, a base electrically coupled to a second terminal of the fourth capacitor and a second terminal of the third resistor pair, and an emitter electrically coupled to the ground;
the third resistor pair having the first terminal electrically coupled to the third power supply
voltage, the second terminal electrically coupled to the base of the NPN transistor and the second terminal of the fourth capacitor, and a third terminal electrically coupled to the ground; and
a fifth capacitor having a first terminal electrically coupled to the third power supply voltage, the third resistor pair, and the collector of the second NPN transistor, and a second terminal electrically coupled to the ground.

9. The circuit of claim 1, where the input terminal is electrically coupled to a ground through a varistor.

10. A stylus for a capacitive sensor, the stylus comprising:
a stylus body;
a circuit disposed within the stylus body, the circuit comprising an input terminal, an amplifier, and an output terminal;
a tip, the tip comprising a sensing electrode and an emitting electrode, the tip disposed on a proximal end of the stylus body; and
a power source, the power source electrically coupled to the circuit,
wherein the input terminal of the circuit is electrically coupled to the sensing electrode of the tip, and the output terminal of the circuit is electrically coupled to the emitting electrode of the tip,
wherein the circuit receives a signal through the sensing electrode, amplifies and inverts the signal, and outputs the signal through the emitting electrode,
wherein the amplifier of the circuit amplifies only a portion of the signal that exceeds a threshold voltage;
wherein the amplifier comprises a plurality of amplifier stages;
wherein the amplifier further comprises a driver stage, and the driver stage comprises:
a first capacitor;
a first driver subcircuit comprising a first PNP transistor, the first PNP transistor having an emitter coupled to a first power supply voltage;
a first resistor pair having a first terminal electrically coupled to the first power supply voltage, a second terminal electrically coupled to a base of the first PNP transistor and a first terminal of the first capacitor, and a third terminal electrically coupled to a ground;
a second capacitor;
a second driver subcircuit comprising a first NPN transistor, the second driver subcircuit being connected between the first driver subcircuit and the ground; and
a second resistor pair having a first terminal electrically coupled to the first power supply voltage, a second terminal electrically coupled to a base of the first NPN transistor and a first terminal of the second capacitor, and a third terminal electrically coupled to the ground.

11. The stylus of claim 10, wherein the first PNP transistor of the first driver subcircuit matches the first NPN transistor of the second driver subcircuit.

12. The stylus of claim 11, wherein the ground in the driver stage is changed to a second power supply voltage that is opposite in polarity to the first power supply voltage.

13. The stylus of claim 10, wherein the driver stage is electrically coupled to the output terminal through a third capacitor.

14. The stylus of claim 13, wherein a first amplifier stage comprises:
a fourth capacitor having a first terminal coupled to the input terminal;
a second NPN transistor having a collector electrically coupled to a third power supply voltage and a first terminal of a third resistor pair, a base electrically coupled to a second terminal of the fourth capacitor and a second terminal of a third resistor pair, and an emitter electrically coupled to the ground;
the third resistor pair having a first terminal electrically coupled to the third power supply voltage, the second terminal electrically coupled to the base of the NPN transistor and the second terminal of the fourth capacitor, and a third terminal electrically coupled to the ground; and
a fifth capacitor having a first terminal electrically coupled to the third power supply voltage, the third resistor pair, and the second NPN transistor, and a second terminal electrically coupled to the ground.

15. The stylus of claim 14, wherein a second amplifier stage comprises:
a sixth capacitor having a first terminal coupled to the first amplifier stage;
a third NPN transistor having a collector electrically coupled to the third power supply voltage, the second terminal of the first capacitor, and the second terminal of the second capacitor, a base electrically coupled to a second terminal of the sixth capacitor and a second terminal of a fourth resistor pair, and an emitter electrically coupled to the ground;
the fourth resistor pair having a first terminal electrically coupled to the third power supply, the second terminal electrically coupled to the base of the NPN transistor and a second terminal of the fourth capacitor, and a third terminal electrically coupled to the ground; and
a seventh capacitor having a first terminal electrically coupled to the third power supply voltage, the first terminal of the fourth resistor pair, and the collector of the third NPN transistor, and a second terminal electrically coupled to the ground.

16. The stylus of claim 14, wherein a second amplifier stage comprises:
a sixth capacitor having a first terminal coupled to the first amplifier stage;
a third NPN transistor having a collector electrically coupled to the third power supply voltage, a base electrically coupled to a second terminal of the sixth capacitor and a second terminal of a fourth resistor pair, and an emitter electrically coupled to the ground, the second terminal of the first capacitor, and the second terminal of the second capacitor;
the fourth resistor pair having a first terminal electrically coupled to the third power supply, the second terminal electrically coupled to the base of the NPN transistor and a second terminal of the fourth capacitor, and a third terminal electrically coupled to the ground; and a seventh capacitor having a first terminal electrically coupled to the third power supply voltage, the first terminal of the fourth resistor pair, and the collector of the third NPN transistor, and a second terminal electrically coupled to the ground.

* * * * *